United States Patent
Sieber et al.

(10) Patent No.: US 7,445,828 B2
(45) Date of Patent: Nov. 4, 2008

(54) ASSEMBLY TAPE WITH SECTIONAL PROTECTIVE FILM

(75) Inventors: Marco Sieber, Horw (CH); Reto Sieber, Sigigen (CH)

(73) Assignee: SILU Verwaltung AG, Meggen (CH)

( * ) Notice: Subject to any disclaimer, the term of this patent is extended or adjusted under 35 U.S.C. 154(b) by 0 days.

(21) Appl. No.: 10/860,751

(22) Filed: Jun. 2, 2004

(65) Prior Publication Data

US 2005/0042404 A1    Feb. 24, 2005

(30) Foreign Application Priority Data

Aug. 18, 2003    (DE) .................. 103 37 878

(51) Int. Cl.
*B32B 7/12*    (2006.01)
*B32B 15/04*    (2006.01)
*B32B 9/00*    (2006.01)
*B65D 65/28*    (2006.01)

(52) U.S. Cl. .................. 428/40.1; 428/43; 428/98; 428/121; 428/343; 428/354

(58) Field of Classification Search .................. 428/43, 428/192, 194, 124, 202, 220, 131, 138, 906, 428/40.1, 42.2, 98, 121, 130, 343, 354
See application file for complete search history.

(56) References Cited

U.S. PATENT DOCUMENTS

| | | | |
|---|---|---|---|
| 2,303,346 A | 12/1942 | Flood | |
| 2,764,501 A | 9/1956 | Perri | |
| 3,257,678 A * | 6/1966 | Batchelder et al. | 12/142 R |
| 3,443,288 A * | 5/1969 | Rubico et al. | 24/67 R |
| 4,590,109 A | 5/1986 | Holmberg | |
| 4,661,099 A | 4/1987 | von Bittera et al. | |
| 4,977,718 A | 12/1990 | Hoffman | |
| 5,378,515 A | 1/1995 | Hatton | |
| 5,593,771 A | 1/1997 | Lawless et al. | |
| 5,711,124 A | 1/1998 | Stough et al. | |
| 5,989,667 A | 11/1999 | Tayebi | |
| 6,025,045 A | 2/2000 | Langeman | |
| 6,833,172 B1 * | 12/2004 | Schwartz | 428/40.1 |
| 2003/0017292 A1 | 1/2003 | Sieber et al. | |
| 2004/0137185 A1 | 7/2004 | Sieber et al. | |
| 2005/0058798 A1 | 3/2005 | Sieber et al. | |

FOREIGN PATENT DOCUMENTS

| | | |
|---|---|---|
| CH | 682551 | 10/2003 |
| DE | 3341555 | 5/1985 |
| DE | 4042441 | 7/1992 |

(Continued)

*Primary Examiner*—Patricia L Nordmeyer
(74) *Attorney, Agent, or Firm*—Fish & Richardson P.C.

(57) ABSTRACT

The invention relates to a pressure-sensitive tape for closing, sealing, and gluing joints, in particular in housing construction, and in particular joints in corners and edges, that has a backing 1 on the tape top side, an adhesive coating 2 of the backing 1 on the tape bottom side, and a removable protective film 3 on the tape bottom side. At least one first fold section 4 is folded in the transverse direction of the tape along a first fold 5 edge that runs in the longitudinal direction of the tape, and at least one portion of the adhesive coating 3 is not covered with the protective film 2 along one longitudinal section of the tape.

22 Claims, 2 Drawing Sheets

FOREIGN PATENT DOCUMENTS

| | | |
|---|---|---|
| DE | 295 21 668 | 2/1998 |
| DE | 297 16 477 | 3/1999 |
| DE | 197 42 558 | 4/1999 |
| DE | 297 15 660 | 5/1999 |
| DE | 20107230 | 8/2001 |
| DE | 20022503 | 12/2001 |
| DE | 201 21 253 | 7/2002 |
| DE | 201 21 277 | 9/2002 |
| DE | 101 35 799 | 2/2003 |
| DE | 20121930 | 10/2003 |
| DE | 20311693 | 11/2003 |
| DE | 20220904 | 7/2004 |
| DE | 10337880 | 12/2004 |
| DE | 10031213 | 10/2005 |
| EP | 0013513 | 7/1980 |
| EP | 1279695 | 7/2001 |
| HU | 177963 | 2/1982 |
| HU | 199174 | 1/1990 |
| HU | 221094 | 8/2002 |
| JP | 64039444 | 9/1989 |
| JP | 5059334 | 3/1993 |
| JP | 8311417 | 11/1996 |
| JP | 9003409 | 1/1997 |
| JP | 9241594 | 9/1997 |
| JP | 10037347 | 10/1998 |
| WO | WO-99/48618 | 9/1999 |
| WO | 02 01013 | 1/2002 |
| WO | WO-02/00802 | 1/2002 |

\* cited by examiner

ASSEMBLY TAPE WITH SECTIONAL PROTECTIVE FILM

The invention relates to a pressure-sensitive tape for closing, sealing, and gluing joints, in particular in housing construction, and in particular joints in corners and edges, a so-called assembly tape, with a backing on the tape top side, an adhesive coating of the backing on the tape bottom side, and a removable protective film on the tape bottom side.

In general such adhesive tapes are used in housing construction when for instance different structural elements, such as doors or windows, are to be inserted into a wall opening and the joint that occurs between the structural elements and the corresponding wall opening must be closed, which must especially occur when installing such structural elements in the exterior walls of buildings in order to attain appropriate sealing.

One general problem of such pressure-sensitive tapes is attaining a good seal, with the least complicated usage possible, by correctly applying such tapes in areas that are difficult to access in order that the joints are closed as air-tight and moisture-tight as possible.

German Offenlegungsschrift DE 101 35 799 A1 from the same applicant indicates an assembly tape for improved joint sealing with a suitable assembly tape dispenser, whereby the corresponding assembly tape has on the tape bottom side an adhesive layer provided on a backing on a tape top side, which [adhesive layer] is provided with a removable protective film on the tape bottom side. The protective film has a slit running in the longitudinal direction and the tape is folded once upon itself in the transverse direction along this slit such that at least a portion of the protective film is disposed on the exterior, that is, on the tape top side. Furthermore, this tape has at least one lateral longitudinal section that is perforated. A special assembly tape dispenser for receiving and dispensing the assembly tape is provided in order to be able to securely handle the rolled-up adhesive assembly tape, which during transport and use slips out of place relatively easily due to the protective film. The single fold in the adhesive assembly tape along a slit in the protective film permits the known adhesive assembly tape to be applied effectively, even in areas that are difficult to access. Although the simple fold along a slit provides reliable processability, during processing the protective film must first be removed along the slit of the fold edge prior to actually applying the cited adhesive assembly tape. Also, in certain applications, especially in very spatially constrained circumstances, it can be desirable to optimize ease of use even further.

This object is attained with a pressure-sensitive adhesive tape comprising a backing having two sides, one side of which forms a top side of the tape, an adhesive coating on the other side of the backing, the adhesive coating forming a bottom side of the tape, and a removable protective film on the tape bottom side, wherein at least one first fold section of the tape is folded in a transverse direction along a first fold edge that runs in a longitudinal direction of the tape and the protective film does not cover at least one portion of the adhesive coating along longitudinal section.

This object is attained with a pressure-sensitive tape in accordance with claim 1.

The inventive pressure-sensitive tape for closing, sealing, and gluing joints, in particular in housing construction, and in particular joints in corners and edges, which are particularly difficult to reach, has a backing on the tape top side, an adhesive coating of the backing on the tape bottom side, and a removable protective film on the tape bottom side. In accordance with the invention, at least one first fold section of the tape is folded in the transverse direction along a first fold edge that runs in the longitudinal direction of the tape, and at least one portion of the adhesive coating along one longitudinal section of the tape is not covered with the protective film.

The inventive combination of a fold with an area of the adhesive coating that is partially not covered by the protective film results in inventively further improved processability of the tape. Thus, the inventive fold, which does not have to run along a slit, offers the advantage that in spatially constrained circumstances, in particular in the area of corners and edges, the tape can be applied clean and fold-free, that is, with the best possible sealing effect. In addition, this protective film does not have to be tediously removed along the portion of the adhesive coating that is not covered with the protective film along a longitudinal section of the inventive tape, which results in more rapid processability of the inventive tape. This also prevents any folds or waste caused by the required removal of the film from occurring in tape that has been applied. Also, such an inventively designed tape does not require an additional assembly tape dispenser for receiving and dispensing the tape, because the inventive tape does not displace when folded or rolled due to the adhesive coating that remains partially free of protective film. The inventive tape is thus especially simple and reliable to use. The inventive tape can also thus be transported to the usage sites or construction sites without the user having to take special packaging or protective measures. Such an inventive tape can be employed for instance in dry construction and/or in concrete-poured construction. Thus, at sites that are spatially very difficult to access, such as 90° corners, for instance between two adjoining dry construction walls, or in the area of a window, where the inventive tape can be applied with the greatest possible precision to the window frame, the risk is avoided that during a subsequent plastering process the tape will be cut through by a blow from a plastering tool and thus its air-tightness will be lost. The pre-fold saves the user much time, in particular when larger window surfaces with a plurality of inserted window frames are to be installed in the exterior walls of a new construction house. Otherwise this folding would have to be done manually—in accordance with the invention this is not necessary. If the inventive adhesive tape is employed in wooden construction, it is sufficient to apply just individual sections of the sealing tape because of the narrower joint widths that occur between mutually adjacent structural elements, so that appropriate inventive arrangement of a suitable slit or slits makes possible very precise and rapid processability of the inventive tape.

In accordance with one preferred embodiment, the adhesive coating of the tape is not covered with the protective film in at least one area of the first fold section. That is, the folded area of the inventive tape preferably does not carry any protective film. Thus, in spatially constrained circumstances, for instance in edges or U-profiles, this area can be unrolled directly from the roll and applied without supplementary aids or steps, such as for instance removing the protective film or tedious folding, whereby reliable sealing results with further simplified processability. This simple form of processing saves up to half of the work time compared to using tapes from prior art.

In accordance with another preferred embodiment, the inventive tape can have a second fold section that is folded in the transverse direction along a second fold edge that runs in the longitudinal direction of the tape. Providing a second fold section permits very flexible adaptation to special geometries of the seal; for instance, in the joint area between a window frame and the surrounding masonry, which is adjacent to the window frame around the corner, using the double fold it is simple to apply to the window frame the part of the adhesive coating of the tape that is free of protective film, while the second fold section can then create the joint around the corner to the masonry.

One embodiment of the invention is preferred in which the protective film has at least one slit in the longitudinal direction of the tape. With this, in addition to the portion of the adhesive coating of the tape that is already free of protective film, another partial area of the correspondingly advantageously designed protective film of the invention is removed along the slit, while another area of the protective film of the inventive tape can remain on the tape bottom side.

Particularly advantageous in this context is one embodiment of the invention in which the second fold edge coincides with the slit in the protective film, since thus the protective film is especially easy to remove from the second fold section. This can result in secure adhesion to the masonry, for instance.

However, in accordance with another preferred embodiment of the invention, it can also be preferred that the second fold edge does not coincide with the slit in the protective film.

Non-coincident fold edge(s) and slit(s) can preferably be separated from each neighbor by a distance of approximately 1 mm to 25 cm.

Particularly preferred is an embodiment of the invention in which an edge section of the protective film projects over the first fold edge and/or the second fold edge. In this manner, one or two grip section(s) result(s) that facilitate(s) removing the protective film in a simple manner by grasping this edge section. This further improves ease of use of the inventive pressure-sensitive film. The section/sections can preferably have a width of approximately 1 mm to 1 cm.

Depending on the individual application, different arrangements of the fold sections can be particularly advantageous for processability.

Thus, in accordance with one preferred embodiment of the invention, the adhesive coating in the area of the second fold section is also not covered with the protective film, just like the area of the first fold section.

The first fold section and the second fold section can be mutually opposing edge sections of the inventive tape; however, it is also possible that the first fold section and the second fold section are adjacent to one another as seen in the transverse direction of the tape. In accordance with another preferred embodiment, the first fold section and the second fold section lie at least partially one upon the other when the tape is folded.

In accordance with another preferred embodiment of the invention, tape bottom side can lie upon tape bottom side in the area of the first fold section and/or in the area of the second fold section; however, in accordance with another preferred embodiment, it is also possible that tape top side lies upon tape top side in the area of the first fold section and/or in the area of the second fold section.

Preferably the width of the first and/or second fold section or the width of the fold sections can be narrower than the width of the tape area that is not folded. Preferably the width of the first and/or second fold section or the width of the fold sections can also be the same width or largely the same width as the width of the tape section that is not folded. Preferably the width of the first and/or second fold section or the width of the fold sections can also be greater than the width of the tape section that is not folded. The width of the first and/or second fold section or the width of the fold sections can preferably be at least 3 mm, more preferably at least 8 mm, even more preferably at least 12 mm, and/or further preferably can equal the width of the tape section that is not folded and/or can even more preferably be greater than the width of the tape section that is not folded.

In order to ensure secure adhesion of the inventive pressure-sensitive tape to a wide variety of materials, even under adverse conditions (cold, moisture), and in order attain the most reliable possible sealing of the inventive pressure-sensitive tape under all circumstances, in accordance with one preferred embodiment the backing comprises a material made from the group of paper, plastic, woven textile, and non-woven textile, or a combination of at least two of these materials, and the adhesive coating comprises at least one material from the group of pressure-sensitive acrylate adhesives, rubber adhesives, butyl adhesives, hot melt, or a combination of at least two of these adhesives.

In accordance with one preferred embodiment, the processability of the inventive tape is particularly improved when the tape is constituted such that at least its backing can be torn manually transverse to the longitudinal direction of the tape. Preferably the protective film can also be torn manually transverse to the longitudinal direction of the tape. Thus it is possible in a simple manner to break the tape into segments without using tools while it is being placed.

In accordance with one preferred embodiment, if the adhesive coating of the inventive tape has a non-adhesive center strip, this makes it even easier in particular to glue joints between two structural elements that are at right angles to one another, since out-of-true gluing with creasing is prevented in a simple manner in the area where these two structural elements meet. The sealing effect is completely retained, since the two edge areas of the tape can be glued.

Particularly easy to use is the inventive pressure-sensitive tape in accordance with one preferred embodiment, in which the tape is rolled up in its folded state into a roll of adhesive tape. This roll is particularly easy to use on site during application, even without an additional dispenser.

In accordance with one preferred embodiment of the inventive tape, provided at least at the side of the first fold edge of the roll is an intermediate layer, which prevents sticking in the area of the first fold edge prior to the actual application of the tape. In the area of the first fold edge, the intermediate layer reliably covers any adhesive coating that is exposed so that it is also possible to reliably prevent soiling particles from accumulating before the tape is even applied. The processability of the thus advantageously designed inventive tape is further improved in this manner.

Preferably the inventive tape has a width of at least 3 cm in the non-folded state, more preferably a width in the range of 3 cm to 50 cm, even more preferably a width in the range of 4 cm to 30 cm, and most preferably a width in the range of 4.5 cm to 20 cm. These dimensions permit somewhat wider joints to be securely sealed, as well, and also prevent the inventive tape from becoming difficult to use due to excessive width so that creases form and there are leaks when the inventive tape is placed.

In accordance with another preferred embodiment of the invention, the tape has at least one perforation area with perforation apertures whose average diameter is at least 3 mm. With such a pressure-sensitive tape it can be assured for instance that the at least one perforation area of the tape can be plastered over, resulting in particularly good anchoring, without jeopardizing the sealing effect of the tape. Advantageously, the at least one perforation area can be embodied on one edge area of the tape; however, it is also possible to provide both edge areas of the tape with a corresponding perforation area. In particular, the corresponding edge areas, which can be embodied as perforation areas, can also correspond to the corresponding first and second fold sections of the tape. At least the center strip of the tape, which should preferably not be perforated, should however be wider than the maximum width of the joint to be sealed, depending on application, in order to ensure optimum sealing. Since the perforated longitudinal section of the inventive tape in accordance with one preferred embodiment is disposed on one edge area of the tape and the center strip remains unperforated, a situation is prevented in which the perforation apertures lead to leaks when the joint to be sealed is covered with the appropriately designed pressure-sensitive tape.

In accordance with another advantageous embodiment of the invention, the backing, the adhesive coating, and the removable protective film are perforated with corresponding continuous perforation apertures. Such perforation apertures can be particularly simply and inexpensively produced using corresponding punches, which leads to favorable manufacturing costs. In general the protective film and/or the backing prevent a perforating tool from coming into contact with the adhesive layer of the pressure-sensitive tape. However, in general it is also possible that the adhesive tape be provided with perforation apertures in the area that is not covered with the protective film.

The perforation apertures can preferably be embodied largely round, polygonal, or oval.

In accordance with another preferred embodiment of the invention, the backing can comprise a material, in particular an open-pore material that has good adhesive properties for plastering. The adhesive effect of the tape on the plaster background is thus additionally improved and the parts of the plastering are thus prevented from detaching from the tape designed in this manner.

The invention is described in detail in the following using exemplary embodiments of the invention in the drawings.

Figure 1:
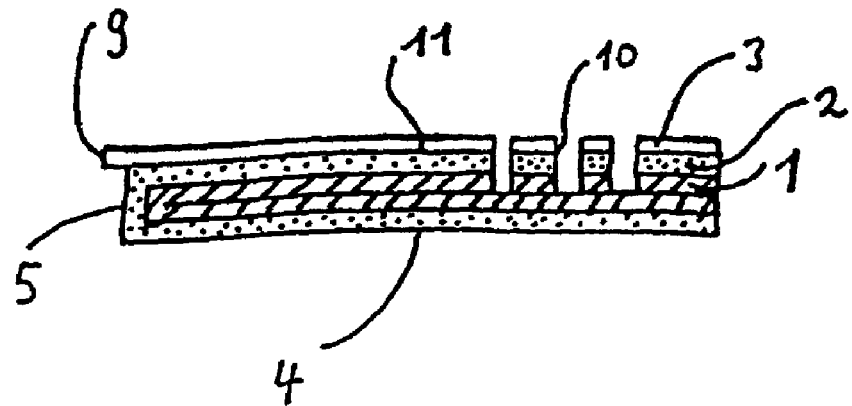
FIG. 1 illustrates sectional view of a first embodiment of an inventive tape in the transverse direction of the tape.

FIG. 1 illustrates a schematic sectional view of one preferred embodiment of a pressure-sensitive tape in accordance with the invention along the transverse direction of the tape. The inventive tape in accordance with FIG. 1 has a backing 1 on a tape top side, an adhesive coating 2 of the backing 1 on the tape bottom side, and a removable protective film 3 on the tape bottom side. A first fold section 4 of the tape is folded over once in the transverse direction along a first fold edge 5 that runs in the longitudinal direction of the tape and a portion of the adhesive coating 2 is not covered with the protective film 3 along a longitudinal section of the tape. The tape thus comes to rest upon itself at least in the folded area, that is, it is folded upon itself. In accordance with FIG. 1, the portion of the adhesive coating 2 that is not covered with the protective film 3 corresponds to the area of the first fold section 4. A first slit 11 of the protective film 3 is provided in the longitudinal direction of the tape, whereby this first slit 11 does not coincide with the first fold edge 5, but in accordance with FIG. 1 is largely present centrally on the top side of the folded tape in accordance with the invention. An edge section 9 of the protective film 3 projects over the first fold edge 5 and thus acts as a grip section for removing the protective film 3. Furthermore, provided in the non-folded area of the inventive tape illustrated in FIG. 1 are perforation apertures 10 that extend in one edge area of the tape through the backing 1, the adhesive coating 2, and the removable protective film 3.

In general it should be noted that the rendering in FIG. 1, and the other renderings, are not to scale and merely provide a schematic illustration of the structure and design of embodiments of the inventive tape. In particular the thicknesses of the individual layers are not provided to scale. In general the inventive tape preferably has a width of at least 3 cm when not folded. The perforation apertures 10 have an average diameter of at least 3 mm.

In accordance with the embodiment illustrated in FIG. 1, the inventive tape is folded upon itself such that the first fold section 4 has the same width as the non-folded section of the inventive tape that is arranged thereabove in FIG. 1.

Figure 2:
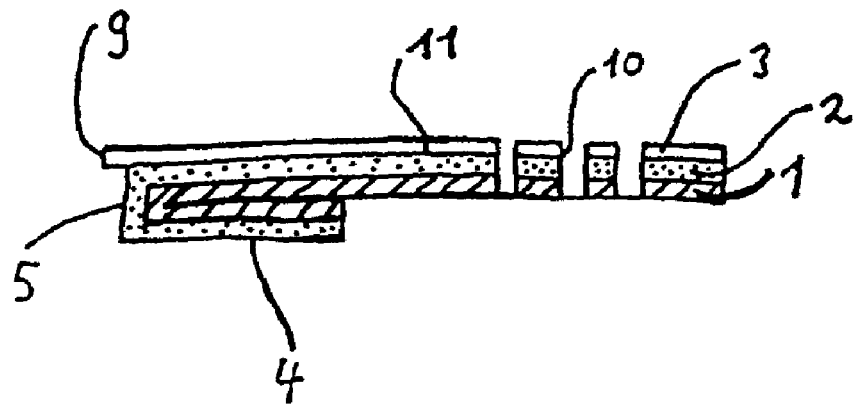
FIG. 2 illustrates a second sectional view of a preferred embodiment of the inventive tape in the transverse direction of the tape.

FIG. 2 illustrates a schematic sectional view of a second embodiment of the invention along the transverse direction of the inventive tape. In FIG. 2, as in the other figures, the same reference numbers indicate identical elements in the invention. The embodiment of the invention illustrated in FIG. 2 largely corresponds to the embodiment of the invention illustrated in FIG. 1, with the difference that the first fold section 4 does not have the same width as the non-folded section. In the embodiment illustrated in FIG. 2, the first fold section 4 has a width that is equal to approximately one-third of the width of the non-folded section or area of the inventive tape that is arranged thereabove in FIG. 2.

Figure 3:
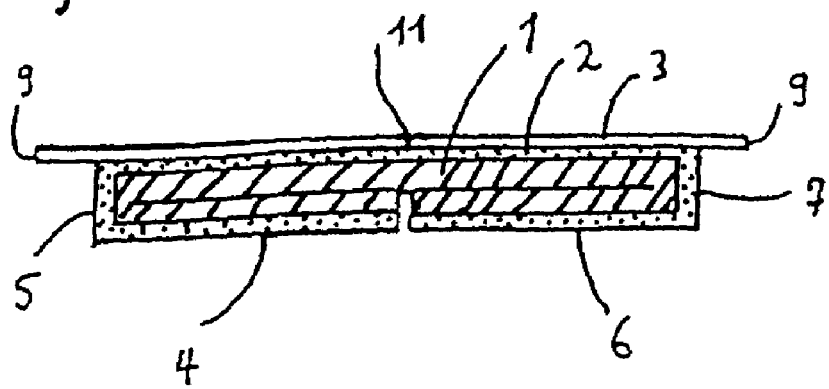
FIG. 3 illustrates a third sectional view of a preferred embodiment of the inventive tape in the transverse direction of the tape.

FIG. 3 illustrates another embodiment of the invention in a schematic sectional view along the transverse direction of the inventive tape. In FIG. 3, as in the other figures, the same reference numbers indicate identical elements in the invention.

In FIG. 3, an embodiment of the invention is illustrated in which a first fold section 4 of the tape is folded in the transverse direction along a first fold edge 5 that runs in the longitudinal direction of the tape and a second fold section 6 is folded in the transverse direction along a second fold edge 7 that runs in the longitudinal direction of the tape. Both fold sections are thus longitudinal sections of the tape that are not covered with the protective film 3. Both the first fold section 4 and the second fold section 6 are edge sections of the tape that are selected in term of their dimensions such that together they approximately correspond to the width of the remaining non-folded pressure-sensitive tape in accordance with the invention. As edge areas of the inventive tape, both the first fold section and the second fold section therefore have a width that is essentially one-quarter of the total width of the tape in its unfolded state. The protective film 3 of the tape has two edge sections 9 of the protective film 3; these project over the first fold edge 5 and the second fold edge 7, respectively. Thus grip sections are formed that make it possible to remove the protective film 3. A first slit 11 is provided that coincides neither with the first fold edge 5 nor with the second fold edge 7. The first slit 11 is inventively arranged approximately in the center of the tape in the folded state; however, in general it can be disposed at any other position in a suitable manner depending on the specific product design.

Figure 4:
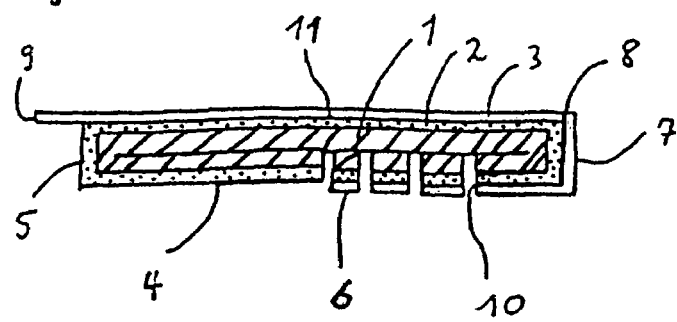
FIG. 4 illustrates a fourth sectional view of a preferred embodiment of the inventive tape in the transverse direction of the tape.

FIG. 4 schematically illustrates a sectional view of a fourth embodiment of the inventive tape. The embodiment in accordance with FIG. 4 largely corresponds to the embodiment in accordance with FIG. 3. The difference is that in accordance with FIG. 4 the protective film 3 also covers the area of the second fold section 6 and the adhesive coating 2 there. Furthermore, in the area of the second fold section 6 the tape has the perforation apertures 10 described in the context of FIG. 1. Additionally provided is a second slit 8 of the protective film 3, which runs in the longitudinal direction of the tape and in accordance with the embodiment illustrated in FIG. 4 coincides with the second fold edge 7. Thus the protective film 3 can be removed along the slit 8 in the area of the second film section 6. The other elements of the tape illustrated in FIG. 4 correspond to the elements that have already been described in the other figures.

Figure 5:
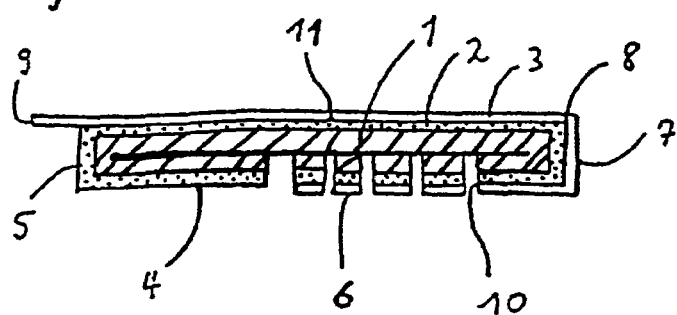
FIG. 5 illustrates a fifth sectional view of a preferred embodiment of the inventive tape in the transverse direction of the tape.

FIG. 5 illustrates a fifth embodiment of the invention in a sectional schematic view along the transverse direction of the inventive tape. In FIG. 5, as in the other figures, the same reference numbers indicate identical elements in the invention. The embodiment of the invention illustrated in FIG. 5 largely corresponds to the embodiment of the invention illustrated in FIG. 4, with the difference that the first fold section 4 and the second fold section 6 do not have the same width, which essentially corresponds to one-quarter of the total width of the tape in its unfolded state. In the embodiment illustrated in FIG. 5, relative to the width of the second fold section 6, the first fold section 4 has a narrower width, which is preferably equal to approximately one-half the width of the second fold section 6. The other elements of the tape illustrated in FIG. 5 correspond to the elements that have already been described for FIG. 4.

Figure 6:
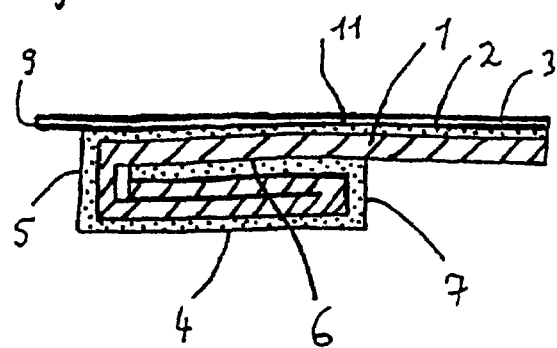
FIG. 6 illustrates a sixth sectional view of a preferred embodiment of the inventive tape in the transverse direction of the tape.

FIG. 6 illustrates another preferred embodiment of the inventive tape in a schematic sectional representation in the transverse direction of the tape.

FIG. 6 also illustrates an embodiment of the inventive tape in which both a first fold section 4 and a second fold section 6 are provided. Differing from the embodiments of the invention illustrated in FIGS. 3, 4, and 5, however, the first fold section 4 and the second fold section 6 are not opposing end sections of the tape, but rather the first fold section 4 and the second fold section 6 abut one another seen in the transverse direction of the tape. Furthermore, the second fold section 6 is folded upon the first fold section 4 such that they lie one upon the other. In accordance with FIG. 6, both the first fold section 4 and the second fold section 6 have no protective film 3 covering the adhesive coating 2. As in the other illustrated embodiments of the invention, the protective film 3 of the inventive tape has a first slit 11 that does not coincide with the first fold edge 5 and also does not coincide with the second fold edge 7.

The invention claimed is:

1. A pressure-sensitive adhesive tape, comprising:
a backing having a top side and a bottom side opposite the top side;
an adhesive coating on portions of the bottom side of the backing, wherein the adhesive is not present on non-perforated and longitudinally extending non-adhesive center strip area of the backing in which there resides no holes, wherein the structure consisting of the backing and the adhesive coating is folded once and along a first fold line that extends in a longitudinal direction of said tape thus forming a once-folded structure, wherein the first fold line divides the once-folded structure of the backing and the adhesive coating into first and second sections that each includes a portion of the adhesive coating, wherein the backing of first section faces the backing of the second section and the adhesive coating on the first section faces away from the adhesive coating on the second section, and wherein a width of the non-adhesive-center strip area is wider than longitudinally extending areas with the adhesive coating that reside on both sides of the non-adhesive center strip area; and
a removable protective film on at least one side of the once-folded structure,
wherein the tape is a continuous strip with a degree of flexibility that allows the tape to be folded without breaking, the tape further having an overall length that is greater than its overall width.

2. The tape of claim 1, wherein in a non-folded state the tape has a width of at least 3 centimeters.

3. The tape of claim 1, further comprising, in at least one area of said tape not concurrent with the non-adhesive and non-perforated center strip, perforation apertures having an average diameter of at least 3 millimeters.

4. The tape of claim 1, wherein said backing comprises an open-pore material that has good adhesive properties for plastering.

5. A pressure-sensitive adhesive tape comprising:
a backing having a top side and a bottom side opposite the top side;
an adhesive coating on at least a portion the bottom side of the backing, wherein the structure consisting of the backing and the adhesive coating is folded once and along a first fold line that extends in a longitudinal direction of said tape thus forming a once-folded structure, wherein the first fold line divides the once-folded structure of the backing and the adhesive coating into first and second sections that each includes a portion of the adhesive coating, wherein the backing of first section faces the backing of the second section and the adhesive coating on the first section faces away from the adhesive coating on the second section; and
a removable protective film on at least one side of the once-folded structure the adhesive tape;
the pressure-sensitive adhesive tape further comprising, in at least one area of said tape, perforation apertures having an average diameter of at least 3 millimeters, wherein the perforation apertures go through said backing, said adhesive coating, and said removable protective film;
wherein the tape is a continuous strip with a degree of flexibility that allows the tape to be folded without breaking, the tape further having an overall length that is greater than its overall width.

6. The tape of claim 5, wherein said perforation apertures are substantially round.

7. The tape of claim 5, wherein said apertures are substantially polygonal.

8. The tape of claim 5, wherein said apertures are substantially oval.

9. The tape of claim 5, wherein said protective film does not cover the adhesive coating in at least one area of said first fold section.

10. The tape of claim 1 or 5, wherein in a non-folded state the tape has a width of 3 centimeters to 50 centimeters.

11. The tape of claim 1 or 5, wherein in a non-folded state the tape has a width of 4 centimeters to 30 centimeters.

12. The tape of claim 1 or 5, wherein in a non-folded state the tape has a width of 4.5 centimeters to 20 centimeters.

13. A tape comprising:
an elongated and flat backing comprising a top side, a bottom side opposite the top side, a length, and a first outer edge and a second outer edge defining a width along the length of the elongated backing layer, the length being greater than the width;

an adhesive layer coating at least a portion of the bottom side of the elongated backing layer, wherein a structure consisting of the backing and the adhesive coating is folded once along a first fold line that extends in a longitudinal direction of said tape thus forming a once-folded structure, wherein the first fold line divides the once-folded structure of the backing and the adhesive coating into first and second sections that each includes a portion of the adhesive coating, wherein the backing of first section faces the backing of the second section and the adhesive coating on the first section faces away from the adhesive coating on the second section, wherein the first fold line is the only longitudinally extending fold in the tape; and a removable protective layer disposed on at least one side of the once-folded structure, the removable protective layer having at least one edge section extending beyond and projecting over the first fold line;

wherein the tape is a continuous and generally flat strip with a degree of flexibility that allows the tape to be folded without breaking, the tape further having an overall length that is greater than its overall width.

14. The tape of claim 13, wherein the backing layer comprises one or more of paper, plastic, woven textile, and non-woven textile, and the adhesive layer comprises one or more of pressure-sensitive acrylate adhesives, rubber adhesives, butyl adhesives, and hot melt adhesives.

15. The tape of claim 13, wherein the adhesive-coated backing is adapted for manual tearing in a direction transverse to the length of the adhesive-coated backing.

16. The tape of claim 13, wherein said backing layer comprises an open-pore material adapted for plastering.

17. The tape of claim 13, further comprising one or more perforations extending through the adhesive layer and the backing.

18. The tape of claim 17, wherein said perforation apertures are substantially round.

19. The tape of claim 17, wherein said backing comprises an open-pore material that has good adhesive properties for plastering.

20. The tape of claim 17, wherein said aperture having an average diameter of at least 3 millimeters.

21. The tape of claim 13, wherein in a non-folded state the tape has a width of 3 centimeters to 50 centimeters.

22. The tape of claim 13, wherein in a non-folded state the tape has a width of 4.5 centimeters to 20 centimeters.

* * * * *

UNITED STATES PATENT AND TRADEMARK OFFICE
CERTIFICATE OF CORRECTION

| | |
|---|---|
| PATENT NO. | : 7,445,828 B2 |
| APPLICATION NO. | : 10/860751 |
| DATED | : November 4, 2008 |
| INVENTOR(S) | : Marco Sieber |

It is certified that error appears in the above-identified patent and that said Letters Patent is hereby corrected as shown below:

Title Page item [30], Foreign Application Priority Data, please delete "103.37.878" and insert --103.37.878.2-- therefor.

Signed and Sealed this

Thirteenth Day of January, 2009

JON W. DUDAS
*Director of the United States Patent and Trademark Office*